Nov. 20, 1928.  S. L. TUCKER ET AL  1,692,100
AUTOMOBILE HEADLIGHT OPERATING MECHANISM
Filed April 2, 1927  2 Sheets-Sheet 2
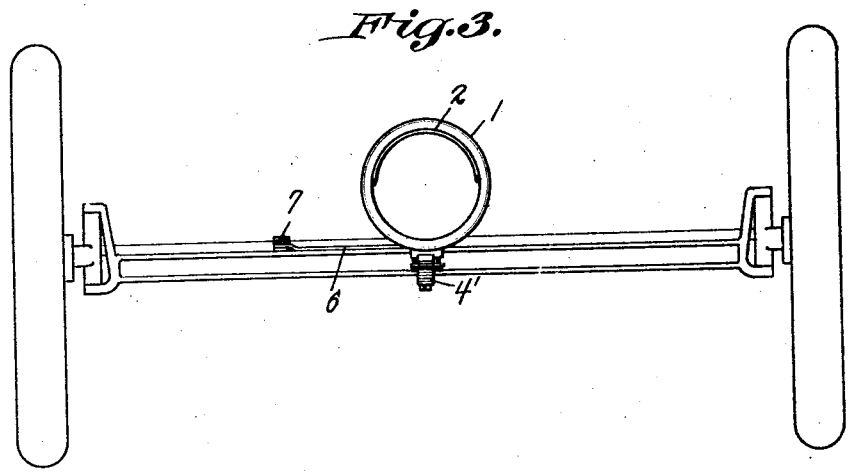
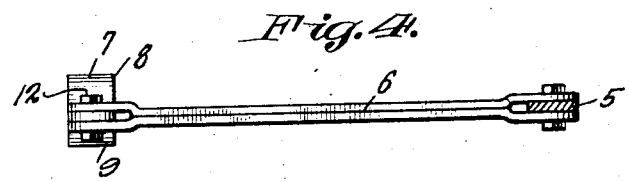
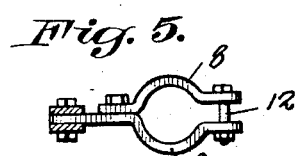
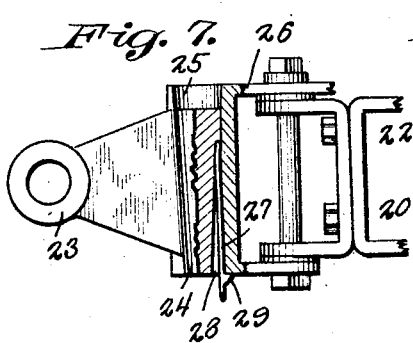 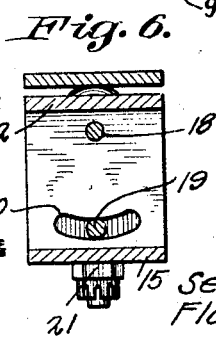 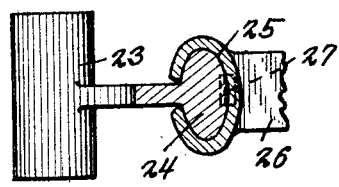
Seth L. Tucker
Floyd C. Tucker
INVENTORS
Witnesses
C. E. Churchman
Wm R. Smith
BY Richard B. Owen
ATTORNEYS.

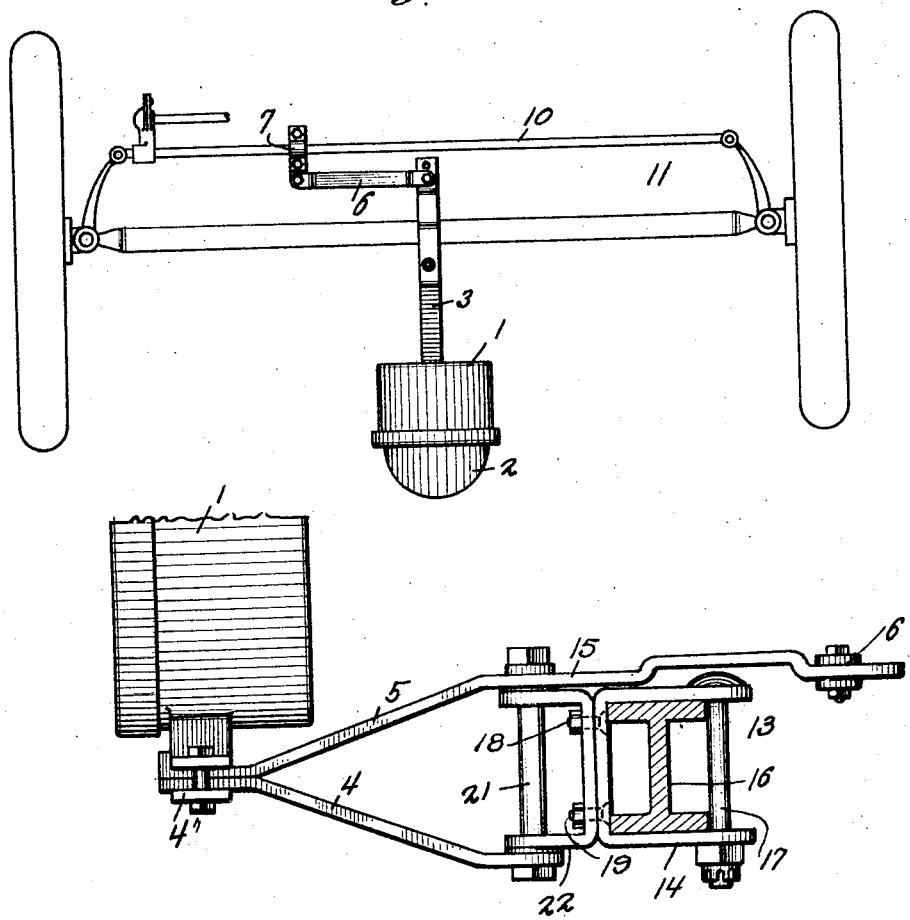

Patented Nov. 20, 1928.

1,692,100

UNITED STATES PATENT OFFICE.

SETH L. TUCKER AND FLOYD C. TUCKER, OF HORNELL, NEW YORK.

AUTOMOBILE HEADLIGHT-OPERATING MECHANISM.

Application filed April 2, 1927. Serial No. 180,544.

This invention relates to a light operating mechanism, and more particularly to the dirigible type, and has for its primary object the construction of mechanism that may be effectively secured to the various types of axle and steering mechanism of automobiles now on the market and in such a manner that the component parts may be economically manufactured and assembled.

An object of the invention is the designing and associating of the various parts so that the mechanism may be effectively supported in place and automatically operated in the operation of the steering mechanism and which is of such a substantial construction that the light will be properly supported in any of its angular positions.

Besides the above, our invention is distinguished in the novel manner in which the supporting bracket is formed from strap iron and associated with a novel construction of bracket so that the latter may adapt itself in any position upon the various types of axle now in use.

With these and other objects in view, our invention will be better understood from a description of the same when taken in connection with the accompanying drawings, wherein:—

Figure 1 is a top plan view of the device in applied position;

Figure 2 is an enlarged side elevation of the mechanism;

Figure 3 is a front elevation;

Figure 4 is a side elevation of the link and its associated parts;

Figure 5 is a view partly in side elevation and partly in section of the clamp;

Figure 6 is a cross sectional view of the adjustable clip and its associated parts;

Figures 7 and 8 are detail sectional views of a modification of the bracket of the invention.

Again referring to the drawings illustrating one embodiment of our invention, the numeral 1 designates a light structure and more particularly the headlight of an automobile which is provided with any suitable form of reflector or shade 2 so as to concentrate the light rays in the proper direction in the angular adjustment of the light structure with our novel construction of operating mechanism now to be described.

Our novel construction of operating mechanism comprises a bracket 3 preferably formed from strap iron, shaped to provide the divergently arranged arms 4 and 5, the forward ends of which contacting a clamp support 4' of the headlight casing 5. Of course, it is to be understood that the forward end of the bracket may be of any construction or configuration to be effectively secured to headlights now on the market. The arms 4 and 5 are of unequal length, with the latter extended rearwardly a distance great enough to be pivotally connected to a link 6 that is also pivotally connected to a clamp 7 that consists of an upper strap 8 and a lower strap 9 effectively secured around the steering rod 10 of the steering mechanism 11 through the use of the clamp bolts 12.

As far as we have proceeded, it will be noted that in the reciprocatory action of the steering rod 10 in the use of the automobile, the bracket will receive movements through the connection of the link 6 and to accomplish this result in a very substantial manner and with parts economically designed and connected, we have illustrated a novel construction of support 13 consisting of a stationary clip 14 and an adjustable clip 15. The clip 14 of U-shaped formation straddles the axle 16 of the automobile and is secured in place by the clamp bolt 17. Due to the shape of various types of axle now on the market and the fact that it is an advantage to adjust the mechanism along the axle so as to assume various positions, we have adjustably associated the clip 15 with the clip 14 through the use of a pivot bolt 18 and a clamp bolt 19, the latter mounted in an arcuate slot 20 in the adjustable clip, and thus it can be appreciated that the adjustable clip can have angular adjustments relative to the stationary clip so that the stationary clip may be positioned on any portion of the axle without interfering with the proper vertical position of the clip 15 so that the bracket may be free to swing at all times.

For the purpose of accommodating the swinging movements of the bracket, we provide a pivot bolt 21 mounted in the ears 22 of the clip 15 and secured in place upon tightening of the nut carried thereby.

From the foregoing description taken in connection with the accompanying drawings, it will be appreciated that in the usual steering of an automobile by the steering mechanism thereof, the bracket will be swung in a horizontal plane due to its link connection with the clamp secured to the steering rod 10, and as the various parts are so arranged and connected the light structure will project the light rays according to the direction of travel of the automobile, thereby effectively illuminating the road under all conditions of travel. A very important feature of the invention is the simple and inexpensive manner in which the various parts are constructed from strap material and assembled so as to materially reduce the cost of manufacture.

As it may be found advisable in practice to completely remove the light structure 1, in the event it is necessary to start the car with the ordinary hand crank we have illustrated in Figures 7 and 8 a modified form of connection whereby the light structure may be readily removed with very little effort. To accomplish this desired result, the attaching lug 23 is directly attached to the headlight 1 and provided with a tapering plug 24 slidably received in a correspondingly shaped socket 25 provided by the bracket 26, the other detail structural features of which being identical with those heretofore described. To effectively secure the plug within the socket, we provide a spring catch 27 mounted within a groove 28 of the plug and adapted to snap under the under surface of the bracket, as indicated at 29.

We wish it to be understood that certain parts may be in the form of castings to be effectively clamped in place and the design and connection of the various other parts may be changed according to manufacturing requirements and, therefore, we do not desire to be limited in any respect except as set forth in the following claims.

We claim:—

1. In headlight control mechanism for automobiles, an attaching member for support by a fixed part of an automobile, a bracket comprising a body formed with a socket and having upper and lower portions extending therefrom, a bolt carried by the support and fitting at its ends through the said upper and lower portions of the bracket whereby to support the bracket for angular movement with respect to the attaching member, one of said portions being extended, means connected therewith for connection with a part of the steering mechanism of the automobile, a headlight supporting member comprising a shank, a head at one end of the shank removably fitted in said socket, the wall of the socket being slotted to accommodate the said shank, and means upon the shank for the support of a headlight.

2. In headlight control mechanism for automobiles, an attaching member for support by a fixed part of an automobile, a bracket comprising a body formed with a socket and having upper and lower portions extending therefrom, a bolt carried by the support and fitting at its ends through the said upper and lower portions of the bracket whereby to support the bracket for angular movement with respect to the attaching member, one of said portions being extended, means connected therewith for connection with a part of the steering mechanism of the automobile, a headlight supporting member comprising a shank, a head at one end of the shank removably fitted in said socket, the wall of the socket being slotted to accommodate the said shank, means upon the shank for the support of a headlight, and a latch member carried by the head of the headlight supporting member and coacting with the lower end of the body of the bracket to restrain the head of the headlight supporting member from disengagement from said socket.

3. In headlight control mechanism for automobiles, an attaching member for support by a fixed part of an automobile, a bracket supported thereon for angular movement, means operatively connected with the bracket and connectible with an element of the steering mechanism of the automobile for effecting angular movement of the bracket, the bracket having a tapered socket provided in its wall with a vertically extending slot, a headlight supporting member comprising a body having a tapered head removably fitted in said socket, the body, adjacent the head, extending through the slot, means upon the body for the attachment thereto of a headlight, the said head having a groove in one side, and a resilient latch mounted in said groove and having a headed end engageable with the lower end of the socketed portion of the bracket.

In testimony whereof we affix our signatures.

SETH L. TUCKER.
FLOYD C. TUCKER.